US012742132B2

(12) United States Patent
Batchelor et al.

(10) Patent No.: US 12,742,132 B2
(45) Date of Patent: Sep. 22, 2026

(54) SURFACTANT AND DETERGENT COMPOSITION

(71) Applicant: Conopco, Inc., Englewood Cliffs, NJ (US)

(72) Inventors: Stephen Norman Batchelor, Chester (GB); David Stephen Grainger, Chester (GB); David Christopher Thorley, Shavington (GB)

(73) Assignee: Conopco, Inc., Englewood Cliffs, NJ (US)

( * ) Notice: Subject to any disclaimer, the term of this patent is extended or adjusted under 35 U.S.C. 154(b) by 487 days.

(21) Appl. No.: 18/020,154

(22) PCT Filed: Aug. 17, 2021

(86) PCT No.: PCT/EP2021/072855
§ 371 (c)(1),
(2) Date: Feb. 7, 2023

(87) PCT Pub. No.: WO2022/043138
PCT Pub. Date: Mar. 3, 2022

(65) Prior Publication Data

US 2023/0287300 A1 Sep. 14, 2023

(30) Foreign Application Priority Data

Aug. 28, 2020 (EP) .................................... 20193480

(51) Int. Cl.
*C11D 1/28* (2006.01)
*C11D 3/00* (2006.01)
*C11D 3/386* (2006.01)

(52) U.S. Cl.
CPC .............. *C11D 1/28* (2013.01); *C11D 3/0036* (2013.01); *C11D 3/386* (2013.01); *C11D 2111/12* (2024.01)

(58) Field of Classification Search
CPC ......... C11D 1/28; C11D 3/0036; C11D 3/386; C11D 2111/12
See application file for complete search history.

(56) References Cited

U.S. PATENT DOCUMENTS 2,324,199 A 7/1943 Datin et al.
3,332,880 A 7/1967 Kessler et al.
3,650,962 A 3/1972 Werdehausen et al.
3,963,499 A * 6/1976 Shiba ................ G03C 7/39236 430/552
4,153,570 A 5/1979 Hennemann et al.
4,206,069 A 6/1980 Borrello
4,435,307 A 3/1984 Barbesgaard et al.
4,760,025 A 7/1988 Estell et al.
5,427,936 A 6/1995 Moeller et al.
5,648,263 A 7/1997 Schülein et al.
5,679,630 A 10/1997 Baeck et al.
5,691,178 A 11/1997 Schülein et al.
5,776,757 A 7/1998 Schülein et al.
5,827,718 A 10/1998 Ishida et al.
5,942,431 A 8/1999 Yoneda et al.
5,998,355 A 12/1999 Brumbaugh
6,172,024 B1 1/2001 Arvanitidou
6,312,936 B1 11/2001 Poulose et al.
6,495,357 B1 12/2002 Fuglsang et al.
6,514,927 B2 2/2003 Lang et al.
6,821,939 B1 11/2004 Szewczyk et al.
7,262,042 B2 8/2007 Weber et al.
8,353,663 B2 1/2013 Arzel et al.
2001/0031712 A1 10/2001 Ziganke et al.
2003/0139317 A1 7/2003 Behler et al.
2003/0171247 A1 9/2003 Meine et al.
2005/0096249 A1 5/2005 Jonas et al.
2008/0105847 A1 5/2008 Lang
2014/0080748 A1 * 3/2014 Price ........................ C11D 1/37 510/228
2014/0116690 A1 5/2014 Bittner et al.
2015/0203798 A1 * 7/2015 Miracle ................ C11D 3/2096 510/324
2015/0218491 A1 8/2015 Morschhaeuser et al.
2016/0208202 A1 7/2016 Himmrich et al.
(Continued)

FOREIGN PATENT DOCUMENTS

CN 1039803 A 2/1990
CN 1061240 A 5/1992
(Continued)

OTHER PUBLICATIONS

WeylChem. "Hostapur SAS: A traditional specialty for innovative cleaners". Sep. 17, 2014. (Year: 2014).*
Park, Dae Sung. "Tunable Oleo-Furan Surfactants by Acylation of Renewable Furans." ACS Cent. Sci. 2016, 2, 11, 802-824. (Year: 2016).*
"Genapol LA 070 S". Clariant. https://www.clariant.com/en/solutions/products/2024/12/16/14/49/genapol-la-070-s (accessed Sep. 5, 2025). (Year: 2024).*
Dartois, V., et al.; "Cloning, nucleotide sequence and expression in *Escherichia coli* of a lipase gene from Bacillus subtilis 168"; Biochimica et Biophysica Acta; 1131, pp. 253-260 (1992).
Search Report and Written Opinion in EP20193306.6; Dec. 23, 2021.
Search Report and Written Opinion in EP20193480; Mar. 12, 2021.
Quack J. M., et al.; Sekundäre Alkansulfonate Entwicklungen auf dem Gebiet der sekundären Alkansulfonate; XP001390743; Tenside Detergents, vol. 22, No. 6 (1985).
(Continued)

*Primary Examiner* — Angela C Brown-Pettigrew
*Assistant Examiner* — Brittany Sharon Harris
(74) *Attorney, Agent, or Firm* — Carter, DeLuca & Farrell, LLP; George Likourezos; Bret P. Shapiro

(57) ABSTRACT

The invention relates to a secondary alkane sulfonate surfactant, wherein at least 70 wt. % of the secondary alkane sulfonate is a secondary alkane sulfonate (SAS) surfactant having linear alkyl chains of from 15 to 18 carbon atoms; wherein less than 30% of the secondary alkane sulfonate (SAS) surfactant has linear alkyl chains of 14 carbon atoms or lower; the invention also concerns a detergent composition comprising the secondary alkane sulfonate surfactant; the invention also concerns a method, preferably a domestic method of treating a textile.

17 Claims, No Drawings

(56) References Cited

U.S. PATENT DOCUMENTS

| | | | |
|---|---|---|---|
| 2017/0066998 A1 | 3/2017 | Holland et al. | |
| 2017/0321160 A1* | 11/2017 | Lant | C12Y 113/11 |
| 2017/0369816 A1 | 12/2017 | Holland et al. | |
| 2019/0112548 A1 | 4/2019 | Pegelow et al. | |

FOREIGN PATENT DOCUMENTS

| | | | | |
|---|---|---|---|---|
| CN | 1207760 A | 2/1999 | | |
| CN | 103347928 A | 10/2013 | | |
| CN | 103380107 A | 10/2013 | | |
| CN | 103725447 A | 4/2014 | | |
| CN | 106281771 | 1/2017 | | |
| CN | 106574209 A | 4/2017 | | |
| CN | 107406805 A | 11/2017 | | |
| CN | 108576035 | 9/2018 | | |
| CN | 110914397 A | 3/2020 | | |
| CN | 116096845 A | 5/2023 | | |
| DE | 2613790 A1 | 10/1976 | | |
| DE | 2800519 A1 | 7/1978 | | |
| DE | 4236698 | 5/1994 | | |
| DE | 19928923 | 12/2000 | | |
| DE | 102007030109 | 1/2009 | | |
| DE | 102007032110 | 1/2009 | | |
| EP | 0218272 | 4/1987 | | |
| EP | 0258068 | 3/1988 | | |
| EP | 0305216 | 3/1989 | | |
| EP | 0331376 | 9/1989 | | |
| EP | 0351928 | 1/1990 | | |
| EP | 0407225 | 1/1991 | | |
| EP | 0260105 | 5/1994 | | |
| EP | 1236793 A2 | 9/2002 | | |
| EP | 3162872 | 5/2017 | | |
| EP | 2346976 B1 * | 2/2019 | | C11D 3/43 |
| FR | 1472561 | 3/1967 | | |
| GB | 987795 | 3/1965 | | |
| GB | 1010588 | 11/1965 | | |
| GB | 1041189 | 9/1966 | | |
| GB | 1296839 | 11/1972 | | |
| GB | 1372034 | 10/1974 | | |
| GB | 1451228 | 9/1976 | | |
| GB | 1494760 | 12/1977 | | |
| GB | 2332443 | 6/1996 | | |
| RU | 2108372 C | 10/1998 | | |
| WO | WO8906270 | 7/1989 | | |
| WO | WO8906279 | 7/1989 | | |
| WO | WO8909259 | 10/1989 | | |
| WO | WO9116422 | 10/1991 | | |
| WO | 9206161 A1 | 4/1992 | | |
| WO | WO9205249 | 4/1992 | | |
| WO | WO9219708 | 11/1992 | | |
| WO | WO9219709 | 11/1992 | | |
| WO | WO9318140 | 9/1993 | | |
| WO | WO9324618 | 12/1993 | | |
| WO | WO9401541 | 1/1994 | | |
| WO | WO9425578 | 11/1994 | | |
| WO | WO9425583 | 11/1994 | | |
| WO | WO9506720 | 3/1995 | | |
| WO | WO9510602 | 4/1995 | | |
| WO | WO9514783 | 6/1995 | | |
| WO | WO9522615 | 8/1995 | | |
| WO | WO9526397 | 10/1995 | | |
| WO | WO9530744 | 11/1995 | | |
| WO | WO06045275 | 12/1995 | | |
| WO | WO9535381 | 12/1995 | | |
| WO | WO9600292 | 1/1996 | | |
| WO | WO9612012 | 4/1996 | | |
| WO | WO9613580 | 5/1996 | | |
| WO | WO9627002 | 9/1996 | | |
| WO | WO9629397 | 9/1996 | | |
| WO | WO9704079 | 2/1997 | | |
| WO | WO9707202 | 2/1997 | | |
| WO | 9718284 A2 | 5/1997 | | |
| WO | WO9812307 | 3/1998 | | |
| WO | WO9815257 | 4/1998 | | |
| WO | 9835002 A1 | 8/1998 | | |
| WO | WO0060060 | 10/2000 | | |
| WO | WO0060063 | 10/2000 | | |
| WO | WO0116285 | 3/2001 | | |
| WO | WO0157170 | 3/2001 | | |
| WO | 0155290 A1 | 8/2001 | | |
| WO | WO0216547 | 2/2002 | | |
| WO | 0222770 A1 | 3/2002 | | |
| WO | WO02026024 | 4/2002 | | |
| WO | WO2005003274 | 1/2005 | | |
| WO | 2005014764 A1 | 2/2005 | | |
| WO | WO2005040372 | 5/2005 | | |
| WO | WO2005052146 | 6/2005 | | |
| WO | WO2005052161 | 6/2005 | | |
| WO | WO2006027086 | 3/2006 | | |
| WO | WO2006032327 | 3/2006 | | |
| WO | WO2006032397 | 3/2006 | | |
| WO | WO2007147866 | 12/2007 | | |
| WO | WO2008017570 | 2/2008 | | |
| WO | WO2008087497 | 7/2008 | | |
| WO | WO2008141880 | 11/2008 | | |
| WO | 2009007166 A1 | 1/2009 | | |
| WO | WO09021867 | 2/2009 | | |
| WO | WO2009087524 | 7/2009 | | |
| WO | WO2009090576 | 7/2009 | | |
| WO | WO2009107091 | 9/2009 | | |
| WO | WO2009111258 | 9/2009 | | |
| WO | WO2009132870 | 11/2009 | | |
| WO | WO2009141173 | 11/2009 | | |
| WO | WO2009148983 | 12/2009 | | |
| WO | WO2010099997 | 9/2010 | | |
| WO | WO2010102861 | 9/2010 | | |
| WO | WO2010148624 | 12/2010 | | |
| WO | WO2010151906 | 12/2010 | | |
| WO | WO2011011799 | 1/2011 | | |
| WO | WO2012054820 | 4/2012 | | |
| WO | 2012104159 A1 | 8/2012 | | |
| WO | 2012112828 A1 | 8/2012 | | |
| WO | WO2013142495 | 9/2013 | | |
| WO | WO2013151970 | 10/2013 | | |
| WO | WO2014029479 | 2/2014 | | |
| WO | WO2015084813 | 6/2015 | | |
| WO | WO2015191434 | 12/2015 | | |
| WO | WO2016005338 | 1/2016 | | |
| WO | WO2012054058 | 4/2016 | | |
| WO | 2016111884 A2 | 7/2016 | | |
| WO | WO2016206837 | 12/2016 | | |
| WO | 2017030996 A1 | 2/2017 | | |
| WO | WO2017079718 | 5/2017 | | |
| WO | WO2017079719 | 5/2017 | | |
| WO | WO2017216216 | 12/2017 | | |
| WO | WO2018085311 | 5/2018 | | |
| WO | 2018206202 A1 | 11/2018 | | |
| WO | WO2019007636 | 1/2019 | | |
| WO | WO2019008036 | 1/2019 | | |
| WO | WO2019075149 | 4/2019 | | |
| WO | WO2020016097 | 1/2020 | | |
| WO | WO2020058088 | 3/2020 | | |
| WO | WO2020229158 | 11/2020 | | |
| WO | 2022042977 A1 | 3/2022 | | |

OTHER PUBLICATIONS

Barakat Y., et al.,; "The Phase Behavior of Simple Salt-Tolerant Sulfonates"; XP055778374; Society of Petroleum Engineers Journal, vol. 23, No. 6 (1983).

Search Report and Written Opinion in EP20193438; Mar. 9, 2021.

Sobisch, T.; "Solubilisation in wäBrigen Lösungen von Tensidmischungen"; Tenside Surfactants Detergents; ; vol. 31, No. 1, pp. 36-38 (1994) (with machine translation).

Search Report and Written Opinion in EP20193390.0: Mar. 3, 2021.

Search Report and Written Opinion in EP20193319; Feb. 26, 2021.

Domsch, A., et al., "Untersuchungen zur Waschwirkung amphoterer Tenside as Zusatze als Flüssigwaschmitteln"; SOFW Journal; 119 (2), pp. 333-334, 337, 338 (1993).

Search Report and Written Opinion in PCT/EP2021/072221; Dec. 6, 2021; World Intellectual Property Org. (WIPO).

International Preliminary Report on Patentability in PCT/EP2021/070963; Dec. 22, 2022; World Intellectual Property Org. (WIPO).

(56) References Cited

OTHER PUBLICATIONS

Siezen R.J., et al., "Homology modelling and protein engineering strategy of subtilases, the family of subtilisin-like serine proteinases"; Protein Engineering, Design and Selection, 4(7), pp. 719-737 (1991).
Siezen, R.J., et al.,; "Subtilases: the superfamily of subtilisin like serine proteases"; Protein Sciences, 6(3), pp. 501-523 (1997).
Douvartzides S.L, et al.,; "Green Diesel: Biomass Feedstocks, Production Technologies, Catalytic Research, Fuel Properties and Performance in Compression Ignition Internal Combustion Engines"; Energies, 12(5) p. 809 (2019).
"HERA: Human & Environment Risk Assessment on ingredients of household cleaning products"; vol. 1 pp. 1-79 (2005).
U.S. Appl. No. 18/020,133, filed Feb. 7, 2023.
U.S. Appl. No. 18/020,138, filed Feb. 7, 2023.
U.S. Appl. No. 18/020,151, filed Feb. 7, 2023.
Biao Zhang et al., "Development of application of surfactants in household detergent", Applied Chemical Industry; vol. 37, pp. 1-15, Feb. 2008, with English translation.
Masri et al. "A sustainable, high-performance process for the economic production of waste-free microbial oils that can replace plant-based equivalents," Energy & Environmental Science Jun. 2019, pp. 2717-2732, 12, Royal Society of Chemistry.
Saad et al., "Algal Biofuels: Current Status and Key Challenges," Energies, May 2019, pp. 1-22; 12, 1920, MDPI.
International Preliminary Report on Patentability issued in International Patent Application No. PCT/EP2021/072221 dated Mar. 9, 2023.
International Search Report and Written Opinion issued in International Patent Application No. PCT/EP2021/070963 dated Nov. 16, 2021.
International Search Report and Written Opinion issued in International Patent Application No. PCT/EP2021/070963 dated Jul. 25, 2022.
International Search Report and Written Opinion issued in International Patent Application No. PCT/EP2021/072186 dated Nov. 24, 2021.
International Patent Report on Patentability issued in International Patent Application No. PCT/EP2021/072186 dated Mar. 9, 2023.
International Search Report and Written Opinion issued in International Patent Application No. PCT/EP2021/072855 dated Dec. 22, 2021.
International Patent Report on Patentability issued in International Patent Application No. PCT/EP2021/072855 dated Mar. 9, 2023.
International Search Report and Written Opinion issued in International Patent Application No. PCT/EP2021/071243 dated Nov. 18, 2021.
International Patent Report on Patentability issued in International Patent Application No. PCT/EP2021/071243 dated Aug. 3, 2022.
Baena-Nogueras, et al., "Reactivity and fate of secondary alkane sulfonates (SAS) in marine sediments", Elsevier, Environmental Pollution, Feb. 2014, pp. 35-42, vol. 189.
Smulders, "Laundry Detergents", Laundry Detergents, Wiley-VCH, 2002, pp. 39-40, 88-90.

* cited by examiner

SURFACTANT AND DETERGENT COMPOSITION

FIELD OF INVENTION

The present invention concerns a detergent composition. More particularly a detergent composition comprising a secondary alkane sulfonate (SAS) surfactant with linear alkyl chains of 15 to 18 carbon atoms.

BACKGROUND OF THE INVENTION

Surfactants comprise an oil soluble hydrocarbon chain with a water solubilising group attached to it. Detergent compositions comprise surfactants to remove soils from substrates. For example, laundry detergents contain surfactants to remove soils from clothing during washing. One such surfactant used is detergent compositions is sodium laureth sulfate, typically having C12-C14 alkyl chains, from 1 to 3 ethoxylates and a sulfate group. There is an environmental wish to move on from such surfactants, as the primary source of the C12-C14 alkyl chains is palm kernel oil.

One such alternative surfactant is secondary alkane sulfonate (SAS). Secondary alkane sulfonate surfactant contains a mixture of predominantly alkyl chains of length C14, C15 and C16. A reference measuring commercial material is *Wat. Res. Vol.* 29, No. 5, 1301-1307, FIG. 3 on page 1305 measures a commercial SAS material (CP) as comprising 40% C14, 32% C15, 19% C16, 9% C17.

There is a desire for domestic detergent formulations that contain secondary alkane sulfonate to have enhanced performance. A problem that exists is to find a surfactant system that provides improved performance.

A further problem is that the weight efficiency of the surfactant is also important for environmental purposes, to give a similar performance using less surfactant is desirable.

Surprisingly, at least one of the aforementioned problems can be solved by using a secondary alkane sulfonate (SAS) surfactant with linear alkyl chains of from 15 to 18 carbon atoms.

SUMMARY OF THE INVENTION

The invention relates in a first aspect to a secondary alkane sulfonate (SAS) surfactant;

- wherein at least 70 wt. %, preferably at least 75%, preferably at least 80%, more preferably at least 85%, more preferably at least 90%, most preferably at least 95% of the secondary alkane sulfonate is a secondary alkane sulfonate (SAS) surfactant having linear alkyl chains of from 15 to 18 carbon atoms;
- wherein less than 30 wt. %, preferably less than 25%, preferably less than 20%, more preferably less than 15%, more preferably less than 10%, most preferably less than 5% of the secondary alkane sulfonate (SAS) surfactant has linear alkyl chains of 14 carbon atoms or lower.

The SAS surfactant, if C15 is present, may have a weight ratio of C15:C17 being from 20:1 to 1:20, preferably from 16:1 to 1:16, preferably from 10:1 to 1:10, preferably from 6:1 to 1:6, preferably from 5:1 to 1:5, preferably from 4:1 to 1:4, preferably from 3:1 to 1:3, preferably from 2:1 to 1:2, preferably 3:2 to 2:3 or even 1:1.

The SAS surfactant, if C18 is present, may have a weight ratio of C16:C18 being from 20:1 to 1:20, preferably from 16:1 to 1:16, preferably from 10:1 to 1:10, preferably from 6:1 to 1:6, preferably from 5:1 to 1:5, preferably from 4:1 to 1:4, preferably from 3:1 to 1:3, preferably from 2:1 to 1:2, preferably 3:2 to 2:3, or even 1:1.

The invention also relates to a detergent composition comprising the secondary alkane sulfonate (SAS) surfactant of the first aspect, wherein the composition comprises:

- a) from 1 to 40 wt. %, preferably from 2 to 30 wt. %, most preferably from 3 to 15 wt. %, of a secondary alkane sulfonate (SAS) surfactant;
  - wherein at least 70 wt. %, preferably at least 75%, preferably at least 80%, more preferably at least 85%, more preferably at least 90%, most preferably at least 95% of the secondary alkane sulfonate is a secondary alkane sulfonate (SAS) surfactant having linear alkyl chains of from 15 to 18 carbon atoms; and,
- b) from 1 to 60 wt. %, preferably from 2 to 40 wt. %, more preferably from 4 to 30 wt. %, most preferably from 5 to 15 wt. % of further surfactants selected from further anionic and non-ionic surfactants;
- c) optionally from 0.001 to 3 wt. % of a perfume;

wherein less than 30%, preferably less than 25%, preferably less than 20%, more preferably less than 15%, more preferably less than 10%, most preferably less than 5% of the secondary alkane sulfonate (SAS) surfactant has linear alkyl chains of 14 carbon atoms or lower.

The SAS material has a low (less than 30%), or preferably zero, amount of C14 alkyl chains and lower. This high amount of C15-C18 and low amount of C14 and lower, combined with if C15 is present, then the weight ratio C15:C17, and if C18 is present, the weight ratio of C16:C18 gives a SAS surfactant with improved performance.

Preferably for the secondary alkane sulfonate (SAS) surfactant if the C15 is present, of C15:C17, and/or the weight ratio, if C18 is present, of C16:C18, is from 20:1 to 1:20, preferably from 16:1 to 1:16, preferably from 10:1 to 1:10, preferably from 6:1 to 1:6, preferably from 5:1 to 1:5, preferably from 4:1 to 1:4, preferably from 3:1 to 1:3, preferably from 2:1 to 1:2, more preferably 3:2 to 2:3.

The weight ratio, for the secondary alkane sulfonate (SAS) surfactant if the C15 is present, of C15:C17, and/or the weight ratio, if C18 is present, of C16:C18, may also be from 60:40 to 40:60, or 45:55 to 55:45, or even approx. 1:1.

Preferably for the secondary alkane sulfonate (SAS) surfactant, if the total wt. % of (C15+C17) alkyl chains is >50 wt. %, then the total wt. % of (C16+C18) alkyl chains is less than 40 wt. %, preferably less than 30 wt. %, preferably less than 20 wt. %, more preferably less than 15 wt. %; and/or wherein if the total wt. % of (C16+C18) alkyl chains is >50 wt. %, then the total wt. % of (C15+C17) alkyl chains is less than 40 wt. %, preferably less than 30 wt. %, preferably less than 20 wt. %, more preferably less than 15 wt. %.

Preferably the alkyl chains of the secondary alkane sulfonate are obtained from renewable sources, preferably from triglycerides.

Preferably the SAS surfactant is a secondary alkane sulfonate (SAS) surfactant with linear alkyl chains of from 15 to 17 carbon atoms. More preferably at least 70 wt. %, preferably at least 75%, preferably at least 80%, more preferably at least 85%, more preferably at least 90%, most preferably at least 95% of the secondary alkane sulfonate is a secondary alkane sulfonate (SAS) surfactant having linear alkyl chains of from 15 to 17 carbon atoms.

Preferably the weight ratio of the total amount of anionic surfactants to the total amount of nonionic surfactants ranges from 4:1 to 1:4, preferably from 2:1 to 1:2, most preferably 1.5:1 to 1:1.5.

Preferably for the detergent composition, if nonionic surfactant is present, then the nonionic surfactant is selected from saturated and mono-unsaturated aliphatic alcohol ethoxylate, preferably selected from $C_{12}$ to $C_{20}$ primary linear alcohol ethoxylates with an average of from 5 to 30 ethoxylates, more preferably $C_{16}$ to $C_{18}$ with an average of from 5 to 25 ethoxylates.

Preferably for the detergent composition, if anionic surfactant is present, then the anionic surfactant is selected from: rhamnolipids, C12 to C18 alkyl ether carboxylates; citric acid ester of a C16 to C18 monoglyceride (citrem), tartartic acid esters of a C16 to C18 monoglyceride (tatem) and diacetyl tartaric acid ester of a C16 to C18 monoglyceride (datem); C12 to C18 alkyl ether sulfates; and water-soluble alkali metal salts of organic sulfates and sulfonates having alkyl radicals containing from about 8 to about 22 carbon atoms; and mixtures thereof; most preferably, the anionic surfactant is selected from: rhamnolipids, C16 to C18 alkyl ether carboxylates; citric acid ester of a C16 to C18 monoglyceride (citrem), tartartic acid esters of a C16 to C18 monoglyceride (tatem); C12 to C18 alkyl ether sulfates, and diacetyl tartaric acid ester of a C16 to C18 monoglyceride (datem) and sulfonates, for example, linear alkyl benzene sulfonate; and mixtures thereof.

Preferably the composition comprises from 0.5 to 15 wt. %, more preferably from 0.75 to 15 wt. %, even more preferably from 1 to 12 wt. %, most preferably from 1.5 to 10 wt. % of cleaning boosters selected from antiredeposition polymers, soil release polymers, alkoxylated polycarboxylic acid esters and mixtures thereof.

Preferably the cleaning boosters are selected from: antiredeposition polymers, preferably alkoxylated polyamines; and soil release polymers, preferably a polyester soil release polymer.

Preferably the detergent composition is a laundry detergent composition, more preferably a laundry liquid detergent composition, or a liquid unit dose detergent composition.

Preferably the composition comprises one or more enzymes from the group: lipases proteases, alpha-amylases, cellulases, peroxidases/oxidases, pectate lyases, and mannanases, or mixtures thereof, more preferably lipases, proteases, alpha-amylases, cellulases and mixtures thereof, wherein the level of each enzyme in the composition of the invention is from 0.0001 wt. % to 0.1 wt. %.

In another aspect the invention provides a method, preferably a domestic method, of treating a textile, the method comprising the step of: treating a textile with an aqueous solution of 0.5 to 20 g/L of the detergent composition, preferably a laundry liquid detergent composition, of any one of claims 2 to 14, preferably wherein the aqueous solution contains 0.1 to 1.0 g/L of the surfactants of (a) and (b); and optionally drying the textile; preferably wherein the domestic method takes place in the home using domestic appliances, wherein the method occurs at wash water temperatures of 280 to 335K.

Preferably in the method the aqueous solution contains 0.1 to 1.0 g/L of the surfactants of (a) and (b).

The method, preferably a domestic method taking place in the home using domestic appliances, preferably occurs at wash water temperatures of 280 to 335K. The textile is preferable soiled with sebum arising from contact with human skin.

DETAILED DESCRIPTION OF THE INVENTION

The indefinite article "a" or "an" and its corresponding definite article "the" as used herein means at least one, or one or more, unless specified otherwise.

All enzyme levels refer to pure protein.

wt. % relates to the amount by weight of the ingredient based on the total weight of the composition. For charged surfactants (for example anionic surfactants), wt. % is calculated based on the protonated form of the surfactant.

The formulation may be in any form for example a liquid, solid, powder, liquid unit dose. Preferably the composition is a liquid detergent composition or a liquid unit dose detergent composition.

The formulation when dissolved in demineralised water at 20° C. preferably has a pH of 3 to 10, more preferably from 4 to 9, more preferably 5 to 7.5, most preferably 7.

Preferably the weight ratio of the total amount of anionic surfactants to the total amount of nonionic surfactants ranges from 4:1 to 1:4, preferably from 2:1 to 1:2, most preferably 1.5:1 to 1:1.5.

Secondary Alkane Sulfonate (SAS)

The secondary alkane sulfonate (SAS) surfactant is as detailed below.

The detergent composition comprises from 1 to 40 wt. %, preferably from 2 to 30 wt. %, most preferably from 3 to 15 wt. %, of a secondary alkane sulfonate (SAS) surfactant, wherein at least 70 wt. %, preferably at least 75%, preferably at least 80%, more preferably at least 85%, more preferably at least 90%, most preferably at least 95% of the secondary alkane sulfonate is a secondary alkane sulfonate (SAS) surfactant having linear alkyl chains of from 15 to 18 carbon atoms, preferably from 15 to 17 carbon atoms.

The C15-C18 secondary alkane sulfonate has the carbon atoms in a linear alkane chain.

Less than 30%, preferably less than 25%, preferably less than 20%, more preferably less than 15%, more preferably less than 10%, most preferably less than 5% of the secondary alkane sulfonate (SAS) surfactant has linear alkyl chains of 14 carbon atoms or lower.

In the SAS surfactant, if C15 is present, then the weight ratio of C15:C17 is from 20:1 to 1:20, preferably from 16:1 to 1:16, preferably from 10:1 to 1:10, preferably from 6:1 to 1:6, preferably from 5:1 to 1:5, preferably from 4:1 to 1:4; and, if C18 is present, then the weight ratio of C16:C18 is from 20:1 to 1:20, preferably from 16:1 to 1:16, preferably from 10:1 to 1:10, preferably from 6:1 to 1:6, preferably from 5:1 to 1:5, preferably from 4:1 to 1:4.

The weight ratio, if C15 is present, of C15:C17, and the weight ratio, if C18 is present, of C16:C18, can be from 3:1 to 1:3, preferably from 2:1 to 1:2, more preferably from 3:2 to 2:3, or even 1:1.

Preferably for the secondary alkane sulfonate (SAS) surfactant, if the total wt. % of (C15+C17) alkyl chains is >50 wt. %, then the total wt. % of (C16+C18) alkyl chains is less than 40 wt. %, preferably less than 30 wt. %, preferably less than 20 wt. %, more preferably less than 15 wt. %; and/or wherein if the total wt. % of (C16+C18) alkyl chains is >50 wt. %, then the total wt. % of (C15+C17) alkyl chains is less than 40 wt. %, preferably less than 30 wt. %, preferably less than 20 wt. %, more preferably less than 15 wt. %.

Preferably the alkyl chains of the secondary alkane sulfonate are obtained from renewable sources, preferably from triglycerides.

Preferably the SAS surfactant is a secondary alkane sulfonate (SAS) surfactant with linear alkyl chains of from 15 to 17 carbon atoms. More preferably at least 70 wt. %, preferably at least 75%, preferably at least 80%, more preferably at least 85%, more preferably at least 90%, most preferably at least 95% of the secondary alkane sulfonate is a secondary alkane sulfonate (SAS) surfactant having linear alkyl chains of from 15 to 17 carbon atoms.

Secondary alkane sulfonates (SAS) of the invention are of the formula:—

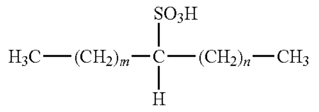

where n+m=12 to 15, with an average chain length of from 15 to 18; preferably n+m=12 to 14, with a mole average chain length of from 15 to 17.

Secondary alkane sulfonates (SAS) is a surfactant used in domestic detergents cleaning products. Secondary alkane sulfonates (SAS) are described in HERA document Secondary Alkane Sulfonate Version 1 April 2005 and in Anionic Surfactants Organic Chemistry edited by H. W. Stache (Surfactant Science Series vol 56, Marcel Dekker 1996) and references therein.

SAS may be obtained by reacting paraffins with sulfur dioxide and oxygen in the presence of water whilst irradiating with ultraviolet light, as described in Anionic Surfactants Organic Chemistry edited by H. W. Stache (Surfactant Science Series vol 56, Marcel Dekker 1996). Secondary Alkane Sulfonates (SAS) obtained from sulfoxidation are a mixture of closely related isomers and homologues of secondary alkane sulfonate sodium salts. The content of primary alkane sulfonates is <1%. The sulfoxidation in the presence of UV light and water results in a mixture of about 90% mono- and 10% disulfonic acids.

Suitable suppliers of SAS are Clariant and Weylchem.

The paraffins feedstock is preferably obtained from triglycerides or fatty acid thereof, by catalytic hydrotreating as described in Energies 2019, 12, 809 Green Diesel: Biomass Feedstocks, Production Technologies, Catalytic Research, Fuel Properties and Performance in Compression Ignition Internal Combustion Engines by S. L. Douvartzides et al.

Hydrotreating involve hydrogenation and decarboxylation, decarbonylation, or hydrodeoxygenation reactions, preferably decarboxylation. Suitable catalysts and conditions for such reactions are discussed in Hoassain M. K et al ACS Omega, 3, 7046-7060 (2018) notably table 4 and reference therein. Such feedstocks may be obtained from UOP Honeywell, Neste Oil, and Haldor Topsøe.

The hydrotreating process can reduce the carbon chain length by 1 unit, depending on the hydrotreating process that is used. The decarboxylation and decarbonylation reactions will typically reduce the carbon chain length by 1 unit, for example:

R—COOH→R—H decarboxylation, where R is alkyl

In this manner the secondary alkane sulfonate is produced from the alkyl chain of predominately C16 to C18 fatty acids from natural triglycerides, but with loss of 1 carbon to give predominately C15 to C17 linear paraffins. Preferably the secondary alkane sulfonate is more than 80 wt. % composed of C15 and C17 chains.

Preferably the alkyl chains of the secondary alkane sulfonate are obtained from renewable sources, preferably from triglycerides.

Triglycerides are preferably obtained from a renewable source.

A renewable source is one where the material is produced by natural ecological cycle of a living species, preferably by a plant, algae, fungi, yeast or bacteria, more preferably plants, algae or yeasts. Fatty acid may be obtained by hydrolysis of a triglyceride.

Preferably the triglyceride predominately contains C18 fatty acids.

Preferred plant sources of oils are crude palm oil, cottonseed, corn germ, wheat germ pumpkin seed, rapeseed, sunflower, peanut, maize, soya, cottonseed, olive oil and trees. The oil from trees is called tall oil. More preferably crude palm oil, cottonseed, corn germ, wheat germ pumpkin seed, sunflower, soya, rapeseed, and peanut. Most preferably crude palm oil, sunflower, soya, rapeseed, and peanut.

Algal oils are discussed in Energies 2019, 12, 1920 Algal Biofuels: Current Status and Key Challenges by Saad M. G. et al. A process for the production of triglycerides from biomass using yeasts is described in Energy Environ. Sci., 2019, 12, 2717.

A sustainable, high-performance process for the economic production of waste-free microbial oils that can replace plant-based equivalents by Masri M. A. et al.

Non edible plant oils may be used and are preferably selected from the fruit and seeds of *Jatropha curcas, Calophyllum inophyllum, Sterculia feotida, Madhuca indica* (mahua), *Pongamia glabra* (koroch seed), Linseed, *Pongamia pinnata* (karanja), *Hevea brasiliensis* (Rubber seed), *Azadirachta indica* (neem), *Camelina sativa, Lesquerella fendleri, Nicotiana tabacum* (tobacco), *Deccan hemp, Ricinus communis* L. (castor), *Simmondsia chinensis* (Jojoba), *Eruca sativa*. L., *Cerbera odollam* (Sea mango), Coriander (*Coriandrum sativum* L.), *Croton megalocarpus*, Pilu, Crambe, syringa, *Scheleichera triguga* (kusum), Stillingia, *Shorea robusta* (sal), *Terminalia belerica* roxb, Cuphea, Camellia, Champaca, *Simarouba glauca, Garcinia indica*, Rice bran, Hingan (balanites), Desert date, Cardoon, Asclepias syriaca (Milkweed), *Guizotia abyssinica*, Radish Ethiopian mustard, Syagrus, Tung, *Idesia polycarpa* var. vestita, Alagae, *Argemone mexicana* L. (Mexican prickly poppy, *Putranjiva roxburghii* (Lucky bean tree), *Sapindus mukorossi* (Soapnut), *M. azedarach* (syringe), *Thevettia peruviana* (yellow oleander), Copaiba, Milk bush, Laurel, Cumaru, Andiroba, Piqui, *B. napus, Zanthoxylum bungeanum.*

The paraffin feedstock preferably contains greater than 50 wt. %, more preferably greater than 80 wt. %, most preferably greater than 95 wt. % linear paraffins. Preferably the paraffins are saturated paraffins and contain less than 2 wt. % unsaturated paraffins.

The weight % of the SAS are calculated as the protonated species.

Further Surfactants

The composition comprises from 1 to 60 wt. %, preferably from 2 to 40 wt. %, more preferably from 4 to 30 wt. %, most preferably from 5 to 15 wt. % of further surfactants selected from further anionic (other than SAS) surfactants and non-ionic surfactants.

Preferably the fraction [wt. % total nonionic surfactant]/[sum wt. % total anionic surfactant] is from 0 to 2, preferably 0 to 1.5, most preferably 0.5 to 1.5, where sum wt. % total anionic surfactant is for SAS plus any further anionic surfactants. All weights of anionic surfactant are calculated as the protonated species.

Preferably the fraction [wt. % SAS]/[sum wt. % total anionic surfactant] is from 0 to 5, more preferably 0 to 1.

Preferably the further surfactants are saturates or monounsaturated with levels of polyunsaturated alkyl chains below 10 wt. %, preferably below 5 wt. %.

In general, the nonionic and anionic surfactants of the additional surfactants may be chosen from the surfactants described in "Handbook of Surfactants" Springer 1991 by M. R. Porter, Biobased Surfactants (Second Edition) Synthesis, Properties, and Applications Pages 287-301 (AOCS press 2019), "Surface Active Agents" Vol. 1, by Schwartz & Perry, Interscience 1949, Vol. 2 by Schwartz, Perry & Berch, Interscience 1958, in the current edition of "McCutcheon's Emulsifiers and Detergents" published by Manufacturing Confectioners Company or in "Tenside-Taschenbuch", H. Stache, 2nd Edn, Carl Hauser Verlag, 1981.

Anionic detergent compounds which may be used are usually water-soluble alkali metal salts of organic sulphates and sulphonates having alkyl radicals containing from about 8 to about 22 carbon atoms, the term alkyl being used to include the alkyl portion of higher acyl radicals. Examples of suitable synthetic anionic detergent compounds are sodium and potassium alkyl sulphates, especially those obtained by sulphating alcohols, produced for example from tallow or coconut oil, sodium and potassium alkyl C10 to C20 benzene sulphonates, particularly sodium linear secondary alkyl C10 to C15 benzene sulphonates; and sodium alkyl glyceryl ether sulphates, especially those ethers of the higher alcohols derived from tallow or coconut oil and synthetic alcohols derived from petroleum. Short chain (C12-15) alcohol ethoxylates may be present with mole average of 7 to 9 ethoxy groups.

Preferred additional surfactants are alcohol ethoxylates, alcohol ether sulfates, methyl ester ethoxylates, rhamnolipids, citric acid ester of a C16 to C18 monoglyceride (citrem), tartartic acid esters of a C16 to C18 monoglyceride (tatem), and diacetyl tartaric acid ester of a C16 to C18 monoglyceride (datem).

Alcohol ethoxylates are discussed Non-Ionic Surfactant Organic Chemistry (N. M. van Os ed), Surfactant Science Series Volume 72, CRC Press. (C16-18) alcohol ethoxylates are preferred with mole average 6 to 14 ethoxy groups. Alcohol ethoxylates composed of mixtures of cetyl (linear C16) and stearyl (linear C18); C18:1(Δ9) ether sulfate or C12 to C15 are preferred.

Alcohol ether sulfates are discussed in Anionic Surfactants: Organic Chemistry edited by H. W Stache (Marcel Dekker 1996), preferably of the form:—

$$R_2—(OCH_2CH_2)_nOSO_3H$$

where $R_2$ is saturated or monounsaturated linear chain with 8 to 18 carbon atoms, preferably C8, C10, C12, C14, C16 and/or C18 alkyl and where n is from 1 to 20, preferably from 3 to 10. More preferably the alcohol ether sulfate is a C16-18 ether sulfates, most preferably mixtures of cetyl (linear C16) and stearyl (linear C18); C18:1(Δ9) ether sulfate; and mixtures thereof, most preferably with a mole average of 4 to 8 ethoxy groups.

Rhamnolipid are described in WO2020/016097 (Unilever). Preferable are the mono-rhamnolipids and di-rhamnolipids. The preferred alkyl chain length is from $C_8$ to $C_{12}$. The alkyl chain may be saturated or unsaturated. Preferably the rhamnolipid is a di-rhamnolipid of formula: $Rha2C_{8-12}C_{8-12}$.

Citrem, tatem, and datem are described in WO2020/058088 (Unilever), Hasenhuettl, G. L and Hartel, R. W. (Eds) Food Emulsifiers and Their Application 2008 (Springer) and in Whitehurst, R. J. (Ed) Emulsifiers in Food Technology 2008 (Wiley-VCH). Monoglyceride based Datems with 1 to 2 diacetyl tartaric acid units per mole surfactant are most preferred.

Perfume

The composition preferably comprises from 0.001 to 3 wt. % of a perfume. This perfume may be free oil perfume or an encapsulated perfume.

Many suitable examples of perfumes are provided in the CTFA (Cosmetic, Toiletry and Fragrance Association) 1992 International Buyers Guide, published by CFTA Publications and OPD 1993 Chemicals Buyers Directory 80th Annual Edition, published by Schnell Publishing Co.

Preferably the perfume comprises at least one note (compound) from: alpha-isomethyl ionone, benzyl salicylate; citronellol; coumarin; hexyl cinnamal; linalool; pentanoic acid, 2-methyl-, ethyl ester; octanal; benzyl acetate; 1,6-octadien-3-ol, 3,7-dimethyl-, 3-acetate; cyclohexanol, 2-(1,1-dimethylethyl)-, 1-acetate; delta-damascone; beta-ionone; verdyl acetate; dodecanal; hexyl cinnamic aldehyde; cyclopentadecanolide; benzeneacetic acid, 2-phenylethyl ester; amyl salicylate; beta-caryophyllene; ethyl undecylenate; geranyl anthranilate; alpha-irone; beta-phenyl ethyl benzoate; alpa-santalol; cedrol; cedryl acetate; cedry formate; cyclohexyl salicyate; gamma-dodecalactone; and, beta phenylethyl phenyl acetate.

Useful components of the perfume include materials of both natural and synthetic origin. They include single compounds and mixtures. Specific examples of such components may be found in the current literature, e.g., in Fenaroli's Handbook of Flavour Ingredients, 1975, CRC Press; Synthetic Food Adjuncts, 1947 by M. B. Jacobs, edited by Van Nostrand; or Perfume and Flavour Chemicals by S. Arctander 1969, Montclair, N.J. (USA).

It is commonplace for a plurality of perfume components to be present in a formulation. In the compositions of the present invention it is envisaged that there will be four or more, preferably five or more, more preferably six or more or even seven or more different perfume components.

In perfume mixtures preferably 15 to 25 wt. % are top notes. Top notes are defined by Poucher (Journal of the Society of Cosmetic Chemists 6(2):80 [1955]). Preferred top-notes are selected from citrus oils, linalool, linalyl acetate, lavender, dihydromyrcenol, rose oxide and cis-3-hexanol.

The International Fragrance Association has published a list of fragrance ingredients (perfumes) in 2011. The Research Institute for Fragrance Materials provides a database of perfumes (fragrances) with safety information.

Perfume top note may be used to cue the whiteness and brightness benefit of the invention. Some or all of the perfume may be encapsulated, typical perfume components which it is advantageous to encapsulate, include those with a relatively low boiling point, preferably those with a boiling point of less than 300, preferably 100-250 Celsius. It is also advantageous to encapsulate perfume components which have a low C Log P (ie. those which will have a greater tendency to be partitioned into water), preferably with a C Log P of less than 3.0. These materials, of relatively low boiling point and relatively low C Log P have been called the "delayed blooming" perfume ingredients and include one or more of the following materials: allyl caproate, amyl acetate, amyl propionate, anisic aldehyde, anisole, benzaldehyde, benzyl acetate, benzyl acetone, benzyl alcohol, benzyl formate, benzyl iso valerate, benzyl propionate, beta gamma hexenol, camphor gum, laevo-carvone, d-carvone, cinnamic alcohol, cinamyl formate, cis-jasmone, cis-3-hexenyl acetate, cuminic alcohol, cyclal c, dimethyl benzyl carbinol, dimethyl benzyl carbinol acetate, ethyl acetate, ethyl aceto acetate, ethyl amyl ketone, ethyl benzoate, ethyl butyrate, ethyl hexyl ketone, ethyl phenyl acetate, eucalyptol, eugenol, fenchyl acetate, flor acetate (tricyclo decenyl acetate), frutene (tricycico decenyl propionate), geraniol, hexenol, hexenyl acetate, hexyl acetate, hexyl formate, hydratropic alcohol, hydroxycitronellal, indone, isoamyl alcohol, iso menthone, isopulegyl acetate, isoquinolone, ligustral, linalool, linalool oxide, linalyl formate, menthone, menthyl acetphenone, methyl amyl ketone, methyl anthranilate, methyl benzoate, methyl benyl acetate, methyl eugenol, methyl heptenone, methyl heptine carbonate, methyl heptyl ketone, methyl hexyl ketone, methyl phenyl carbinyl acetate, methyl salicylate, methyl-n-methyl anthranilate, nerol, octalactone, octyl alcohol, p-cresol, p-cresol methyl ether, p-methoxy acetophenone, p-methyl acetophenone, phenoxy ethanol, phenyl acetaldehyde, phenyl ethyl acetate, phenyl ethyl alcohol, phenyl ethyl dimethyl carbinol, prenyl acetate, propyl bornate, pulegone, rose oxide, safrole, 4-terpinenol, alpha-terpinenol, and/or viridine. It is commonplace for a plurality of perfume components to be present in a formulation. In the compositions of the present invention it is envisaged that there will be four or more, preferably five or more, more preferably six or more or even seven or more different perfume components from the list given of delayed blooming perfumes given above present in the perfume.

Another group of perfumes with which the present invention can be applied are the so-called 'aromatherapy' materials. These include many components also used in perfumery, including components of essential oils such as Clary Sage, Eucalyptus, Geranium, Lavender, Mace Extract, Neroli, Nutmeg, Spearmint, Sweet Violet Leaf and Valerian.

It is preferred that the laundry treatment composition does not contain a peroxygen bleach, e.g., sodium percarbonate, sodium perborate, and peracid.

Further Preferred Ingredients

Cleaning Boosters

The composition preferably comprises from 0.5 to 15 wt. %, more preferably from 0.75 to 15 wt. %, even more preferably from 1 to 12 wt. %, most preferably from 1.5 to 10 wt. % of cleaning boosters selected from antiredeposition polymers; soil release polymers; alkoxylated polycarboxylic acid esters as described in WO/2019/008036 and WO/2019/007636; and mixtures thereof.

Antiredeposition Polymers

Preferred antiredeposition polymers include alkoxylated polyamines.

A preferred alkoxylated polyamine comprises an alkoxylated polyethylenimine, and/or alkoxylated polypropylenimine. The polyamine may be linear or branched. It may be branched to the extent that it is a dendrimer. The alkoxylation may typically be ethoxylation or propoxylation, or a mixture of both. Where a nitrogen atom is alkoxylated, a preferred average degree of alkoxylation is from 10 to 30, preferably from 15 to 25. A preferred material is ethoxylated polyethyleneimine, with an average degree of ethoxylation being from 10 to 30 preferably from 15 to 25, where a nitrogen atom is ethoxylated.

Soil Release Polymer

Preferably the soil release polymer is a polyester soil release polymer.

Preferred soil release polymers include those described in WO 2014/029479 and WO 2016/005338.

Preferably the polyester based soil release polymer is a polyester according to the following formula (I)

(I)

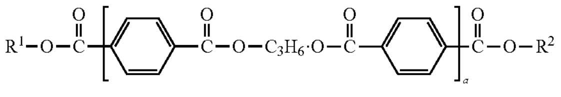

wherein $R^1$ and $R^2$ independently of one another are $X—(OC_2H_4)_n—(OC_3H_6)_m$ wherein X is $C_{1-4}$ alkyl and preferably methyl, the $—(OC_2H_4)$ groups and the $—(OC_3H_6)$ groups are arranged blockwise and the block consisting of the $—(OC_3H_6)$ groups is bound to a COO group or are $HO—(C_3H_6)$, and preferably are independently of one another $X—(CC_2H_4)_n—(CC_3H_6)_m$, n is based on a molar average number of from 12 to 120 and preferably of from 40 to 50, m is based on a molar average number of from 1 to 10 and preferably of from 1 to 7, and a is based on a molar average number of from 4 to 9.

Preferably the polyester provided as an active blend comprising:

A) from 45 to 55% by weight of the active blend of one or more polyesters according to the following formula (I)

(I)

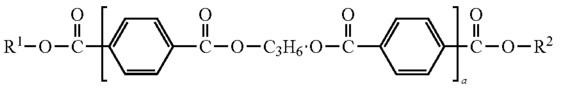

wherein $R_1$ and $R_2$ independently of one another are $X—(OC_2H_4)_n—(OC_3H_6)_m$ wherein X is $C_{1-4}$ alkyl and preferably methyl, the $—(OC_2H_4)$ groups and the $—(OC_3H_6)$ groups are arranged blockwise and the block consisting of the $—(OC_3H_6)$ groups is bound to a COO group or are $HO—(C_3H_6)$, and preferably are independently of one another $X—(OC_2H_4)_n—(OC_3H_6)_m$, n is based on a molar average number of from 12 to 120 and preferably of from 40 to 50, m is based on a molar average number of from 1 to 10 and preferably of from 1 to 7, and a is based on a molar average number of from 4 to 9 and B) from 10 to 30% by weight of the active blend of one or more alcohols selected from the group consisting of ethylene glycol, 1,2-propylene glycol, 1,3-propylene glycol, 1,2-butylene glycol, 1,3-butylene glycol, 1,4-butylene glycol and butyl glycol and C) from 24 to 42% by weight of the active blend of water.

Alkoxylated Polycarboxylic Acid Esters

Alkoxylated polycarboxylic acid esters are obtainable by first reacting an aromatic polycarboxylic acid containing at least three carboxylic acid units or anhydrides derived therefrom, preferably an aromatic polycarboxylic acid containing three or four carboxylic acid units or anhydrides derived therefrom, more preferably an aromatic polycarboxylic acid containing three carboxylic acid units or anhydrides derived therefrom, even more preferably trimellitic acid or trimellitic acid anhydride, most preferably trimellitic acid anhydride, with an alcohol alkoxylate and in a second step reacting the resulting product with an alcohol or a mixture of alcohols, preferably with C16/C18 alcohol.

Enzymes

Preferably enzymes, such as lipases, proteases, alpha-amylases, cellulases, peroxidases/oxidases, pectate lyases, and mannanases, or mixtures thereof, may be present in the formulation.

If enzymes are present, then preferably they are selected from: lipases, proteases, alpha-amylases, cellulases and mixtures thereof.

If present, then the level of each enzyme in the laundry composition of the invention is from 0.0001 wt. % to 0.1 wt. %.

Levels of enzyme present in the composition preferably relate to the level of enzyme as pure protein.

Suitable lipases include those of bacterial or fungal origin. Chemically modified or protein engineered mutants are included. Examples of useful lipases include lipases from *Humicola* (synonym *Thermomyces*), e.g. from *H. lanuginosa* (*T. lanuginosus*) as described in EP 258 068 and EP 305 216 or from *H. insolens* as described in WO 96/13580, a *Pseudomonas lipase, e.g. from P. alcaligenes* or *P. pseudoalcaligenes* (EP 218 272), *P. cepacia* (EP 331 376), *P. stutzeri* (GB 1,372,034), *P. fluorescens, Pseudomonas* sp. strain SD 705 (WO 95/06720 and WO 96/27002), *P. wisconsinensis* (WO 96/12012), a *Bacillus lipase*, e.g. from *B. subtilis* (Dartois et al. (1993), Biochemica et Biophysica Acta, 1131, 253-360), *B. stearothermophilus* (JP 64/744992) or *B. pumilus* (WO 91/16422). Other examples are lipase variants such as those described in WO 92/05249, WO 94/01541, EP 407 225, EP 260 105, WO 95/35381, WO 96/00292, WO 95/30744, WO 94/25578, WO 95/14783, WO 95/22615, WO 97/04079 and WO 97/07202, WO 00/60063.

Preferred commercially available lipase enzymes include LIPOLASE™ and LIPOLASE ULTRA™, LIPEX™ and LIPOCLEAN™ (Novozymes A/S)

The invention may be carried out in the presence of phospholipase classified as EC 3.1.1.4 and/or EC 3.1.1.32. As used herein, the term phospholipase is an enzyme which has activity towards phospholipids.

Phospholipids, such as lecithin or phosphatidylcholine, consist of glycerol esterified with two fatty acids in an outer (sn-1) and the middle (sn-2) positions and esterified with phosphoric acid in the third position; the phosphoric acid, in turn, may be esterified to an amino-alcohol. Phospholipases are enzymes which participate in the hydrolysis of phospholipids. Several types of phospholipase activity can be distinguished, including phospholipases $A_1$ and $A_2$ which hydrolyze one fatty acyl group (in the sn-1 and sn-2 position, respectively) to form lysophospholipid; and lysophospholipase (or phospholipase B) which can hydrolyze the remaining fatty acyl group in lysophospholipid. Phospholipase C and phospholipase D (phosphodiesterases) release diacyl glycerol or phosphatidic acid respectively.

Protease enzymes hydrolyse bonds within peptides and proteins, in the laundry context this leads to enhanced removal of protein or peptide containing stains. Examples of suitable proteases families include aspartic proteases; cysteine proteases; glutamic proteases; aspargine peptide lyase; serine proteases and threonine proteases. Such protease families are described in the MEROPS peptidase database (http://merops.sanger.ac.uk/). Serine proteases are preferred. Subtilase type serine proteases are more preferred. The term “subtilases” refers to a sub-group of serine protease according to Siezen et al., Protein Engng. 4 (1991) 719-737 and Siezen et al. Protein Science 6 (1997) 501-523. Serine proteases are a subgroup of proteases characterized by having a serine in the active site, which forms a covalent adduct with the substrate. The subtilases may be divided into 6 sub-divisions, i.e. the Subtilisin family, the Thermitase family, the Proteinase K family, the Lantibiotic peptidase family, the Kexin family and the Pyrolysin family.

Examples of subtilases are those derived from *Bacillus* such as *Bacillus lentus, B. alkalophilus, B. subtilis, B. amyloliquefaciens, Bacillus pumilus* and *Bacillus gibsonii* described in; U.S. Pat. No. 7,262,042 and WO09/021867, and subtilisin lentus, subtilisin Novo, subtilisin Carlsberg, *Bacillus licheniformis*, subtilisin BPN', subtilisin 309, subtilisin 147 and subtilisin 168 described in WO 89/06279 and protease PD138 described in (WO 93/18140). Other useful proteases may be those described in WO 92/175177, WO 01/016285, WO 02/026024 and WO 02/016547. Examples of trypsin-like proteases are trypsin (e.g. of porcine or bovine origin) and the *Fusarium* protease described in WO 89/06270, WO 94/25583 and WO 05/040372, and the chymotrypsin proteases derived from Cellumonas described in WO 05/052161 and WO 05/052146.

Most preferably the protease is a subtilisins (EC 3.4.21.62).

Examples of subtilases are those derived from *Bacillus* such as *Bacillus lentus, B. alkalophilus, B. subtilis, B. amyloliquefaciens, Bacillus pumilus* and *Bacillus gibsonii* described in; U.S. Pat. No. 7,262,042 and WO09/021867, and subtilisin lentus, subtilisin Novo, subtilisin Carlsberg, *Bacillus licheniformis*, subtilisin BPN', subtilisin 309, subtilisin 147 and subtilisin 168 described in WO89/06279 and protease PD138 described in (WO93/18140). Preferably the subsilisin is derived from *Bacillus*, preferably *Bacillus lentus, B. alkalophilus, B. subtilis, B. amyloliquefaciens, Bacillus pumilus* and *Bacillus gibsonii* as described in U.S. Pat. No. 6,312,936 BI, U.S. Pat. Nos. 5,679,630, 4,760,025, 7,262,042 and WO 09/021867. Most preferably the subtilisin is derived from *Bacillus gibsonii* or *Bacillus lentus.*

Suitable commercially available protease enzymes include those sold under the trade names ALCALASE®, BLAZE®; DURALASE™, DURAZYM™, RELASE®, RELASE® Ultra, SAVINASE®, Ultra, PRIMASE®, POLARZYME®, KANNASE®, LIQUANASE®, LIQUANASE® Ultra, OVOZYME®, CORONASE®, CORONASE® Ultra, NEATRASE®, EVERLASE® and ESPERASE® all could be sold as ULTRA® or EVITY® (Novozymes A/S).

The invention may use cutinase, classified in EC 3.1.1.74. The cutinase used according to the invention may be of any origin. Preferably cutinases are of microbial origin, in particular of bacterial, of fungal or of yeast origin.

Suitable amylases (alpha and/or beta) include those of bacterial or fungal origin. Chemically modified or protein engineered mutants are included. Amylases include, for example, alpha-amylases obtained from *Bacillus*, e.g. a special strain of *B. licheniformis*, described in more detail in GB 1,296,839, or the *Bacillus* sp. strains disclosed in WO 95/026397 or WO 00/060060. Commercially available amylases are DURAMYL™, TERMAMYL™, TERMAMYL ULTRA™, NATALASE™, STAINZYME™, FUNGAMYL™ and BAN™ (Novozymes A/S), RAPIDASE™ and PURASTRAR™ (from Genencor International Inc.).

Suitable cellulases include those of bacterial or fungal origin. Chemically modified or protein engineered mutants are included. Suitable cellulases include cellulases from the genera *Bacillus, Pseudomonas, Humicola, Fusarium, Thielavia, Acremonium*, e.g. the fungal cellulases produced from *Humicola insolens, Thielavia terrestris, Myceliophthora thermophila*, and *Fusarium oxysporum* disclosed in U.S. Pat. Nos. 4,435,307, 5,648,263, 5,691,178, 5,776,757, WO 89/09259, WO 96/029397, and WO 98/012307. Commercially available cellulases include CELLUZYME™, CAREZYME™, CELLUCLEAN™, ENDOLASE™, RENOZYME™ (Novozymes A/S), CLAZINASE™ and PURADAX HA™ (Genencor International Inc.), and KAC-500 (B)™ (Kao Corporation). CELLUCLEAN™ is preferred.

Suitable peroxidases/oxidases include those of plant, bacterial or fungal origin. Chemically modified or protein engineered mutants are included. Examples of useful peroxidases include peroxidases from *Coprinus*, e.g. from *C. cinereus*, and variants thereof as those described in WO 93/24618, WO 95/10602, and WO 98/15257. Commercially available peroxidases include GUARDZYME™ and NOVOZYM™ 51004 (Novozymes A/S).

Further enzymes suitable for use are discussed in WO 2009/087524, WO 2009/090576, WO 2009/107091, WO 2009/111258 and WO 2009/148983.

Enzyme Stabilizers

Any enzyme present in the composition may be stabilized using conventional stabilizing agents, e.g., a polyol such as propylene glycol or glycerol, a sugar or sugar alcohol, lactic acid, boric acid, or a boric acid derivative, e.g., an aromatic borate ester, or a phenyl boronic acid derivative such as 4-formylphenyl boronic acid, and the composition may be formulated as described in e.g. WO 92/19709 and WO 92/19708.

Further Ingredients

The formulation may contain further ingredients.

Builders or Complexing Agents

The composition may comprise a builder or a complexing agent.

Builder materials may be selected from 1) calcium sequestrant materials, 2) precipitating materials, 3) calcium ion-exchange materials and 4) mixtures thereof.

Examples of calcium sequestrant builder materials include alkali metal polyphosphates, such as sodium tripolyphosphate and organic sequestrants, such as ethylene diamine tetra-acetic acid.

The composition may also contain 0-10 wt. % of a builder or complexing agent such as ethylenediaminetetraacetic acid, diethylenetriamine-pentaacetic acid, citric acid, alkyl- or alkenylsuccinic acid, nitrilotriacetic acid or the other builders mentioned below.

More preferably the laundry detergent formulation is a non-phosphate built laundry detergent formulation, i.e., contains less than 1 wt. % of phosphate. Most preferably the laundry detergent formulation is not built i.e. contain less than 1 wt. % of builder.

If the detergent composition is an aqueous liquid laundry detergent it is preferred that mono propylene glycol or glycerol is present at a level from 1 to 30 wt. %, most preferably 2 to 18 wt. %, to provide the formulation with appropriate, pourable viscosity.

Fluorescent Agent

The composition preferably comprises a fluorescent agent (optical brightener).

Fluorescent agents are well known and many such fluorescent agents are available commercially. Usually, these fluorescent agents are supplied and used in the form of their alkali metal salts, for example, the sodium salts.

The total amount of the fluorescent agent or agents used in the composition is generally from 0.0001 to 0.5 wt. %, preferably 0.005 to 2 wt. %, more preferably 0.01 to 0.1 wt. %. Preferred classes of fluorescer are: Di-styryl biphenyl compounds, e.g. TINOPAL™ CBS—X, Di-amine stilbene di-sulphonic acid compounds, e.g. TINOPAL™ DMS pure Xtra and BLANKOPHOR™ HRH, and Pyrazoline compounds, e.g. BLANKOPHOR™ SN. Preferred fluorescers are fluorescers with CAS-No 3426-43-5; CAS-No 35632-99-6; CAS-No 24565-13-7; CAS-No 12224-16-7; CAS-No 13863-31-5; CAS-No 4193-55-9; CAS-No 16090-02-1; CAS-No 133-66-4; CAS-No 68444-86-0; CAS-No 27344-41-8.

Most preferred fluorescers are: sodium 2 (4-styryl-3-sulfophenyl)-2H-napthol[1,2-d]triazole, disodium 4,4'-bis{[(4-anilino-6-(N methyl-N-2 hydroxyethyl) amino 1,3,5-triazin-2-yl)]amino}stilbene-2-2' disulphonate, disodium 4,4'-bis{[(4-anilino-6-morpholino-1,3,5-triazin-2-yl)]amino} stilbene-2-2' disulphonate, and disodium 4,4'-bis(2-sulphostyryl)biphenyl.

Shading Dye

It is advantageous to have shading dye present in the formulation.

Dyes are described in *Color Chemistry Synthesis, Properties and Applications of Organic Dyes and Pigments*, (H Zollinger, Wiley VCH, Zurich, 2003) and, Industrial Dyes Chemistry, Properties Applications. (K Hunger (ed), Wiley-VCH Weinheim 2003).

Dyes for use in laundry detergents preferably have an extinction coefficient at the maximum absorption in the visible range (400 to 700 nm) of greater than 5000 L $mol^{-1}$ $cm^{-1}$, preferably greater than 10000 L $mol^{-1}$ $cm^{-1}$.

Preferred dye chromophores are azo, azine, anthraquinone, phthalocyanine and triphenylmethane. Azo, anthraquinone, phthalocyanine and triphenylmethane dyes preferably carry a net anionic charged or are uncharged. Azine dyes preferably carry a net anionic or cationic charge.

Blue or violet Shading dyes are most preferred. Shading dyes deposit to fabric during the wash or rinse step of the washing process providing a visible hue to the fabric. In this regard the dye gives a blue or violet colour to a white cloth with a hue angle of 240 to 345, more preferably 260 to 320, most preferably 270 to 300. The white cloth used in this test is bleached non-mercerised woven cotton sheeting.

Shading dyes are discussed in WO 2005/003274, WO 2006/032327 (Unilever), WO 2006/032397 (Unilever), WO 2006/045275 (Unilever), WO 2006/027086 (Unilever), WO 2008/017570 (Unilever), WO 2008/141880 (Unilever), WO 2009/132870 (Unilever), WO 2009/141173 (Unilever), WO 2010/099997 (Unilever), WO 2010/102861 (Unilever), WO 2010/148624 (Unilever), WO 2008/087497 (P&G), WO 2011/011799 (P&G), WO 2012/054820 (P&G), WO 2013/142495 (P&G), WO 2013/151970 (P&G), WO 2018/085311 (P&G) and WO 2019/075149 (P&G).

A mixture of shading dyes may be used.

The shading dye chromophore is most preferably selected from mono-azo, bis-azo and azine.

Mono-azo dyes preferably contain a heterocyclic ring and are most preferably thiophene dyes. The mono-azo dyes are preferably alkoxylated and are preferably uncharged or anionically charged at pH=7. Alkoxylated thiophene dyes are discussed in WO2013/142495 and WO2008/087497. A preferred example of a thiophene dye is shown below:

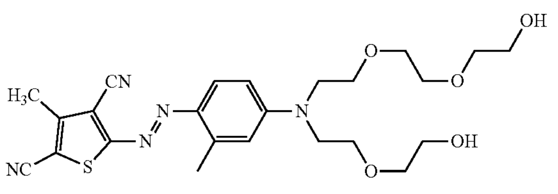 [SMILES: Cc1cc(N(CCOCCO)CCOCCOCCO)ccc1/N=N/c1sc(C#N)c(C)c1C#N]

Bis-azo dyes are preferably sulphonated bis-azo dyes. Preferred examples of sulphonated bis-azo compounds are direct violet 7, direct violet 9, direct violet 11, direct violet 26, direct violet 31, direct violet 35, direct violet 40, direct violet 41, direct violet 51, direct violet 66, direct violet 99 and alkoxylated versions thereof.

Alkoxylated bis-azo dyes are discussed in WO2012/054058 and WO/2010/151906. An example of an alkoxylated bis-azo dye is:

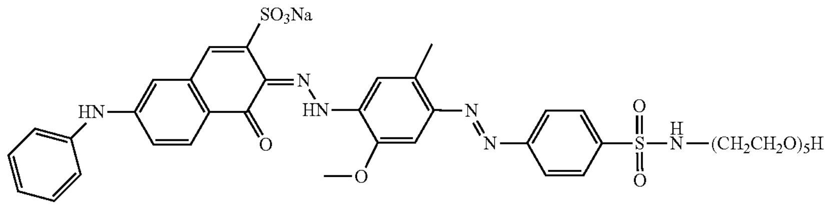

Azine dyes are preferably selected from sulphonated phenazine dyes and cationic phenazine dyes. Preferred examples are acid blue 98, acid violet 50, dye with CAS-No 72749-80-5, acid blue 59, and the phenazine dye selected from:

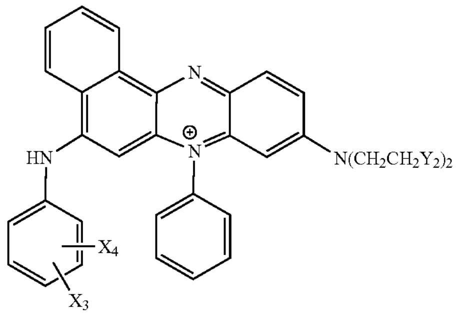

wherein:

$X_3$ is selected from: —H; —F; —$CH_3$; —$C_2H_5$; —$OCH_3$; and, —$OC_2H_5$;

$X_4$ is selected from: —H; —$CH_3$; —$C_2H_5$; —$OCH_3$; and, —$OC_2H_5$;

$Y_2$ is selected from: —OH; —$OCH_2CH_2OH$; —CH(OH)$CH_2OH$; —OC(O)$CH_3$; and, C(O)$OCH_3$.

Anthraquinone dyes covalently bound to ethoxylate or propoxylated polyethylene imine may be used as described in WO2011/047987 and WO 2012/119859.

The shading dye is preferably present is present in the composition in range from 0.0001 to 0.1 wt %. Depending upon the nature of the shading dye there are preferred ranges depending upon the efficacy of the shading dye which is dependent on class and particular efficacy within any particular class. As stated above the shading dye is preferably a blue or violet shading dye.

Polymers

The composition may comprise one or more further polymers. Examples are carboxymethylcellulose, poly (ethylene glycol), poly(vinyl alcohol), polycarboxylates such as polyacrylates, maleic/acrylic acid copolymers and lauryl methacrylate/acrylic acid copolymers.

Where alkyl groups are sufficiently long to form branched or cyclic chains, the alkyl groups encompass branched, cyclic and linear alkyl chains. The alkyl groups are preferably linear or branched, most preferably linear.

Adjunct Ingredients

The detergent compositions optionally include one or more laundry adjunct ingredients.

To prevent oxidation of the formulation an anti-oxidant may be present in the formulation.

The term "adjunct ingredient" includes: perfumes, dispersing agents, stabilizers, pH control agents, metal ion control agents, colorants, brighteners, dyes, odour control agent, pro-perfumes, cyclodextrin, perfume, solvents, soil release polymers, preservatives, antimicrobial agents, chlorine scavengers, anti-shrinkage agents, fabric crisping agents, spotting agents, anti-oxidants, anti-corrosion agents, bodying agents, drape and form control agents, smoothness agents, static control agents, wrinkle control agents, sanitization agents, disinfecting agents, germ control agents, mould control agents, mildew control agents, antiviral agents, antimicrobials, drying agents, stain resistance agents, soil release agents, malodour control agents, fabric refreshing agents, chlorine bleach odour control agents, dye fixatives, dye transfer inhibitors, shading dyes, colour maintenance agents, colour restoration, rejuvenation agents, anti-fading agents, whiteness enhancers, anti-abrasion agents, wear resistance agents, fabric integrity agents, anti-wear agents, and rinse aids, UV protection agents, sun fade inhibitors, insect repellents, anti-allergenic agents, enzymes, flame retardants, water proofing agents, fabric comfort agents, water conditioning agents, shrinkage resistance agents, stretch resistance agents, and combinations thereof. If present, such adjuncts can be used at a level of from 0.1% to 5% by weight of the composition

The invention claimed is:

1. A detergent composition comprising: from 1 to 40 wt. % of a secondary alkane sulfonate surfactant comprising linear alkyl chains, wherein at least 85 wt. % of the secondary alkane sulfonate surfactant has linear alkyl chains of from 15 to 18 carbon atoms and less than 15 wt. % of the secondary alkane sulfonate surfactant has linear alkyl chains of 14 carbon atoms or lower; from 1 to 60 wt. % of further surfactants selected from further anionic surfactants excluding the secondary alkane sulfonate surfactant; non-ionic surfactants; and optionally, from 0.001 to 3 wt. % of a perfume.

2. The detergent composition according to claim 1, wherein if C15 is present in the secondary alkane sulfonate surfactant, a weight ratio of C15: C17 is from 20:1 to 1:20.

3. The detergent composition according to claim 1, wherein when a total wt. % of C15+C17 alkyl chains is >50 wt. % for the secondary alkane sulfonate surfactant, then a total wt. % of C16+C18 alkyl chains is less than 40 wt. % for the secondary alkane sulfonate surfactant.

4. The detergent composition according to claim 1, wherein the linear alkyl chains of the secondary alkane sulfonate surfactant are obtained from renewable sources.

5. The detergent composition according to claim 1, wherein at least 70 wt. % of the linear alkyl chains of the secondary alkane sulfonate surfactant have from 15 to 17 carbon atoms.

6. The detergent composition according to claim 1, wherein the nonionic surfactant is selected from saturated and mono-unsaturated aliphatic alcohol ethoxylate.

7. The detergent composition according to claim 1, wherein the further anionic surfactant is selected from: rhamnolipids, C12 to C18 alkyl ether carboxylates, citric acid ester of a C16 to C18 monoglyceride (citrem), tartartic acid esters of a C16 to C18 monoglyceride (tatem), and diacetyl tartaric acid ester of a C16 to C18 monoglyceride (datem), C12 to C18 alkyl ether sulfates, and water-soluble alkali metal salts of organic sulfates and sulfonates having alkyl radicals containing from about 8 to about 22 carbon atoms, and mixtures thereof.

8. The detergent composition according to claim 1, further comprising from 0.5 to 15 wt. % of cleaning boosters selected from antiredeposition polymers, soil release polymers, alkoxylated polycarboxylic acid esters and mixtures thereof.

9. The detergent composition according to claim 8, wherein the cleaning boosters are antiredeposition polymers.

10. The detergent composition according to claim 1, wherein the composition is a laundry detergent composition.

11. The detergent composition according to claim 1, further comprising one or more enzymes from the group: lipases, proteases, alpha-amylases, cellulases, peroxidases/oxidases, pectate lyases, mannanases, or mixtures thereof, preferably lipases, proteases, alpha-amylases, cellulases and mixtures thereof.

12. The detergent composition according to claim 1, wherein a weight ratio of a total amount of anionic surfactants to a total amount of nonionic surfactants ranges from 4:1 to 1:4.

13. A method of treating a textile comprising the step of: treating a textile with an aqueous solution of 0.5 to 20 g/L of the detergent composition of claim 1; and optionally drying the textile.

14. The detergent composition according to claim 1, wherein if C18 is present in the secondary alkane sulfonate surfactant, a weight ratio of C16:C18 is from 20:1 to 1:20.

15. The detergent composition according to claim 1, wherein the linear alkyl chains of the secondary alkane sulfonate surfactant are triglycerides.

16. The detergent composition according to claim 1, wherein the nonionic surfactant is selected from C12 to C20 primary linear alcohol ethoxylates with an average of from 5 to 30 ethoxylates.

17. The detergent composition according to claim 11, wherein a level of each of the enzymes in the composition is from 0.0001 wt. % to 0.1 wt. %.

* * * * *